Figure 1:
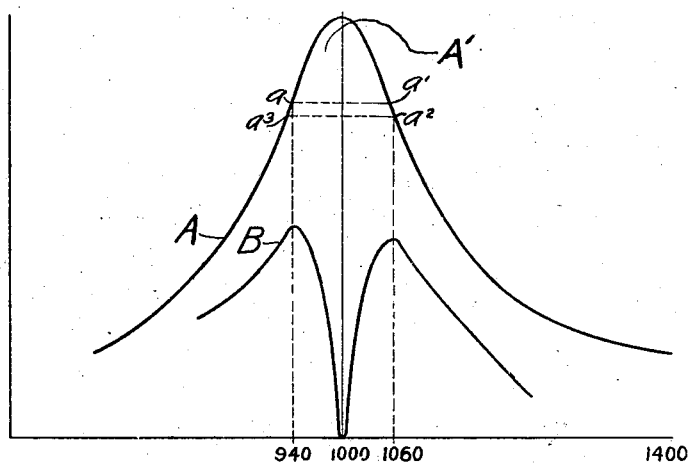

Sept. 13, 1927.  1,641,973

J. W. HORTON

FREQUENCY METER

Filed April 18, 1922

Inventor:
Joseph W. Horton
by E. V. Griggs
Att'y.

Patented Sept. 13, 1927.

1,641,973

UNITED STATES PATENT OFFICE.

JOSEPH W. HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

FREQUENCY METER.

Application filed April 18, 1922. Serial No. 555,284.

This invention relates to a method of and means for measuring the frequency and hence wave length of an alternating current.

Heretofore, it has been the practice to measure the frequency and thereby determine the wave length of an alternating current by using some form of resonant transmission device associated with an apparatus to indicate the amplitude of the transmitted wave. To determine an unknown frequency or to adjust a source of current to a known frequency, either the resonance point of the resonant transmission device or the frequency of the source, as the case may be, is varied until the current flowing through the resonant device is a maximum and hence the deflection recorded in the indicating apparatus is a maximum. In order that maximum current may be supplied to the indicating apparatus the resonant transmission device must be sharply selective of the frequency of the current supplied to it.

The present invention is directed to an arrangement adapted to utilize the attenuation properties of a resonant transmitting device to control the deflection of the indicating apparatus associated with it, whereby the frequency of the current supplied to the device or the adjustment of the resonance point of the device may be accurately determined. To secure the desired indication the resonant transmitting device included in this arrangement is always tuned to a frequency different from that of the current transmitted through it. It will therefore be apparent that this apparatus does not use a circuit resonant to the frequency of the current being measured.

As is well known, if the frequency of the current supplied to a resonant transmitting device, i. e., tuned circuit or filter, is varied over an appreciable range, the impedance loss or current attenuation and hence the transmission equivalent of the resonant transmitting device varies. Moreover, if the resonance point of a tuned circuit or filter, the characteristic curve of which is accurately known, is set at a definite frequency, the impedances or attenuations of this circuit for currents of other frequencies, which it is adapted to transmit with more or less attenuation, are determined by the characteristic curve.

Thus if the resonance point of a filter is set at a definite frequency, say 1000 cycles, it is possible to determine definitely from its characteristic curve the magnitude of its impedance for currents of other frequencies. For instance, its impedance for currents of 900, 940 and 980 cycles may be 150, 65 and 25 ohms respectively. This property of a tuned circuit or filter is utilized for the purposes of this invention. Since the change of deflection recorded by an indicator which measures transmission thru the resonant device is most marked at the point of the given characteristic curve where the rate of change of current is a maximum, this point has been selected for the purpose of illustrating the principles involved in this invention.

According to this invention, a resonant transmitting device and a non-resonant network are alternately used to transmit current from a given source to an indicating circuit. The desired frequency determination of the source or tuning of the resonant circuit is ascertained by a comparison of the attenuations exhibited by the two transmitting circuits, the resonant device being so adjusted that the frequency of the source occurs at the steepest point of the curve representing the relation between its attenuation and the applied frequency.

The primary object of the present invention is to accurately indicate the frequency of the current passing through a resonant transmitting device.

Another object is to cause the deflection recorded by the indicator to be dependent upon the attenuation of a resonant transmitting device for the current which is supplied to it.

Still another object is to permit the indication recorded to be accurately checked.

A further object is to effect a frequency indication by a resonant transmitting device which is not sharply tuned to the frequency of the current being measured.

An additional object is to compare the energy supplied to the input terminals of a selective transmitting device with that available at its output terminals.

A further object is to set the frequency of carrier wave sources, or to adjust the selective transmission devices ordinarily associated with them, by means of the ordinary apparatus included in the terminal equipment of a carrier wave transmission system.

Figure 2:
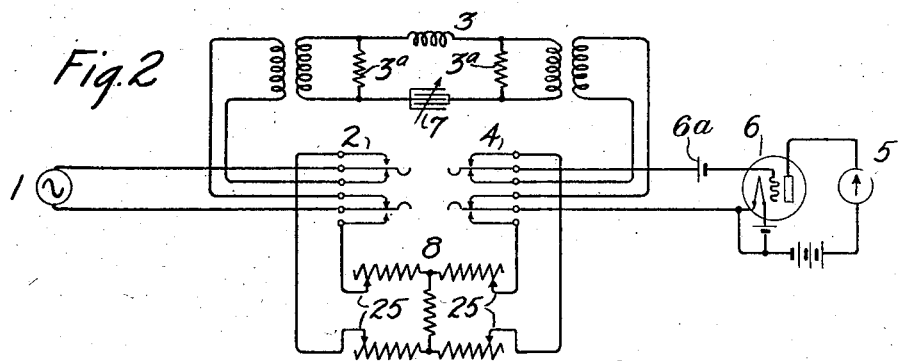
Figure 3:
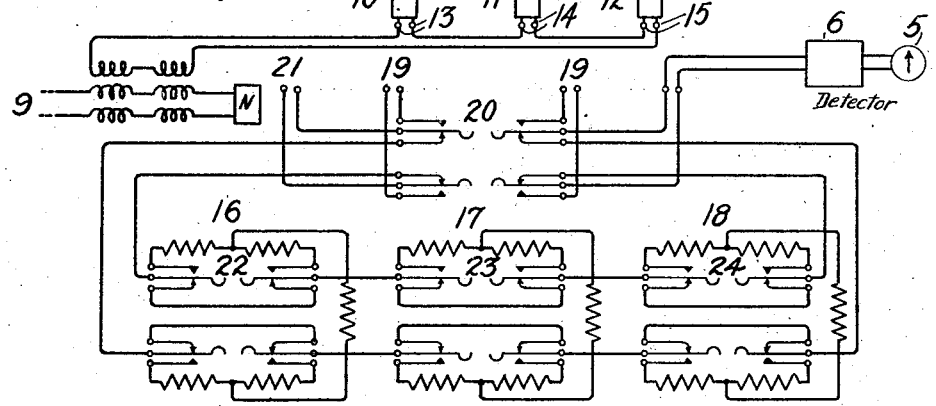

For a complete understanding of this invention reference may be made to the following detailed description taken in connection with the attached drawing in which Fig. 1 shows curves which illustrate current variations, and rate of current variations in a resonant transmitting device with change of frequency of the waves supplied to the device. Fig. 2 shows a circuit arrangement for practicing the invention. Fig. 3 illustrates the application of this invention to a line over which alternating currents of three different frequencies are adapted to be transmitted.

In Fig. 1, the ordinates represent current values with reference to curve A and rate of change of current with frequency when referred to curve B, and the abscissæ represent frequencies. Curve A, being an ordinary characteristic curve, serves to illustrate the amplitude of the current transmitted through a resonant transmitting device when the frequency of the electric wave supplied to it is varied over an appreciable range, or the amplitude of the current when the frequency of the source is maintained constant and the resonance point of the device is varied over a similar range. As therein indicated the critical frequency is 1000 cycles. If now, the frequency of the current supplied by the source is varied from 700 cycles upwardly and the resonance point of the resonant device is set at 1000 cycles, or if the resonance point of the device is similarly varied and the frequency of the source is maintained at 1000 cycles, the value of the current transmitted through the resonant device will increase to a maximum, as is indicated by the point A' on curve A. When a current of 1000 cycles is supplied to the device, a current of maximum amplitude will be transmitted therethrough, whereas, an increase or decrease of the frequency, or variation of the resonance point, will result in a decrease in the current amplitude.

The rate of change of amplitude of the current transmitted through the selective circuit, is shown in curve B. Referring to this curve it will be seen that the rate of change of the current becomes a maximum at 940 cycles, rapidly falls to zero at 1000 cycles, again increases to a second but different maximum at 1060 cycles and gradually falls off to some lower value at 1400 cycles.

In order to make use of the attenuating properties of a resonant transmitting device for wave length or frequency measurement, or for adjusting the frequency of an alternating current source, an arrangement such as that shown in Fig. 2 is used. In this Figure, there is shown an alternating current source 1, which is adapted to be connected by a key or switch 2 to a pair of terminals of a resonant transmitting device 3. A second pair of terminals of the resonant device are connected by a key or switch 4 to a local circuit including an indicating device.

The resonant transmission device 3 includes a variable condenser 7 which may be adjusted to vary the frequency selectivity of the device in case such adjustment is desirable. This device is also provided with coupling resistances $3^a$ adapted to render its selectivity independent of changes in the reactances of the circuits coupled thereto.

For low frequency systems the indicating instrument may comprise any sensitive voltage controlled instrument, but for high frequencies such as are used for carrier and radio transmission, a detecting device should be included in the indicating circuit.

The arrangement shown is adapted for use with high frequency systems and comprises a detector 6, which may be a three electrode space discharge device, associated with an indicating instrument 5. A source $6^a$ supplies, to the impedance control electrode of the device 6, a negative polarizing potential of such value that normally there is substantially no current flow through the plate circuit of the detector.

The incoming high frequency waves transmitted through the device 3 are supplied to the input circuit of the detector. The positive half cycle of the detected waves serve to reduce the negative potential impressed upon the grid of the device 6 by the source $6^a$, whereby the amplitude of the current flowing through the plate circuit and supplied to the indicator 5 is increased.

Referring to Fig. 1 it will be seen that between 940 cycles and 1060 cycles respectively, the curve A is relatively flat-topped, and hence for a limited range adjacent to its resonant frequency the amplitude of the oscillations supplied to the detector 6 will be substantially constant. Thus, for a definite frequency range between the points at which the rate of change of curent with change of frequency is a maximum the indicator will record a substantially constant deflection. Because of this fact, an accurate determination of the frequency or the proper adjustment of the transmitting device is attended with considerable difficulty.

However, the attenuation of a resonant transmitting device for currents of different frequencies can be accurately determined from its characteristic curve. By providing a network the attenuation of which is independent of frequency and is equal to that of the transmitting device at the point where the rate of change of current is a maximum, means is provided whereby the accuracy of the adjustment, whether of the frequency of the source or the selectivity of the transmitting device, may be checked.

For this purpose a network 8 is provided. One pair of terminals of this network are connected to contacts of the switch 2, while the other pair of terminals of the network are connected to contacts of the switch 4.

The network 8 is non-resonant and hence its attenuation is independent of frequency. This network is designed to have the same attenuation as the resonant circuit 3 at the point on its characteristic curve where the rate of change of current amplitude or from another viewpoint, the rate of change of attenuation is a maximum.

Assume, as above, that the resonant circuit is designed for the transmission without appreciable attenuation of waves of 1000 cycles and, as shown in curve B, the points at which the maximum rate of change of current attenuations occur are 940 and 1060 cycles. Further, let it be assumed that it is desired to adjust the generator to supply a current of 940 cycles.

The resonance point of the circuit 3 is set accurately at 1000 cycles by adjusting the condenser 7 which is calibrated for this purpose and the deflection of the instrument 5 noted. The keys 2 and 4 are then actuated to disconnect the filter 3 and substitute in its stead the network 8, the attenuation of which at the setting assumed, is the same as that of the resonant circuit for 940 cycle current. If the deflection indicated by the instrument is greater or less than that recorded before the substitution of the non-resonant network, the frequency of the current supplied by the source 1 is either above or below 940 cycles. The frequency of the current supplied by the source 1 should be adjusted until equal deflections are produced when the filter 3 is included between the source 1 and the indicator 5 and when the filter is replaced by the network 8. In this manner the accuracy of the adjustment made may be checked.

The adjustment of a resonant transmitting device, to render it selective for an alternating current of definite frequency, may be accurately determined in a somewhat similar manner. For example, to adjust a filter to resonance at 1000 cycles, the procedure is as follows:—A current known to be of 940 cycles frequency is alternately supplied to the filter 3 and the non-resonant circuit 8, the condenser 7 being varied until equal deflections are recorded in the indicator 5. The curve A is not symmetrical about the A' or 1000 cycle axis and hence there are two frequency points $a$ and $a'$, at which the amplitude of the current transmitted is the same, i. e. at 940 cycles and in the vicinity of 1050 cycles. The points $a^2$ and $a^3$ identify two other frequencies at which equal current amplitude is transmitted, the former point indicating a frequency of 1060 cycles and the latter about 930 cycles. Since maximum deflection of the indicating device is recorded at the resonance point of the filter 3, namely, at 1000 cycles, a means of identifying these points is readily available. The points $a$ and $a'$ may be distinguished, since the point $a$ (940 cycles) is obtained with an increasing deflection while $a'$ (1050 cycles) is obtained with a decreasing deflection. Points $a^2$ and $a^3$ may also be distinguished since $a^2$ (1060 cycles) is obtained with a decreasing deflection while $a^3$ (930 cycles) is obtained with an increasing deflection. The points $a$ and $a^3$, as also $a'$ and $a^2$ will be distinguished, because at points $a$ and $a^2$ respectively, the rate of change of deflection will be a maximum, whereas at $a^3$ and $a'$ a lesser rate of change of deflection will be indicated. Again, the position of the resonance point of the tuned circuit or filter will be roughly indicated by the condenser setting which, in view of the fact that the calibration curve of the tuned circuit or filter is accurately known, will serve as a check in effecting the desired adjustment. The network 8 will serve as an additional means to differentiate between the points $a$ and $a^3$ on the one hand, and between $a^1$ and $a^2$ on the other.

In some cases it may be necessary to provide means for adjusting the non-resonant network so that its attenuation may be made equal to that of the resonant circuit when the tuning of the latter is adjusted to different frequencies. A plurality of movable contacts 25 associated with the network 8 may be used for this purpose. Again these contacts 25 may be adjusted to vary the transmission equivalent of the non-resonant network over the possible transmission range of a resonant circuit, in which case by using a resonant circuit the resonance point of which may be set at different frequencies or a plurality of resonant circuits having their resonance points fixed at different frequencies, the calibration curves of which are known for the different frequency settings, the apparatus may be used for frequency calibration purposes.

To accurately determine an unknown frequency any well known type of wave meter, or a meter of the type described above including a resonant device 3 and associated indicator 5 operating as an ordinary wave meter, may be used to obtain an approximate frequency indication. A meter including a resonant transmitting circuit 3, characteristic curves of which for different frequency settings are known, which is designed to freely transmit a band of frequencies within which the unknown frequency lies, and a non-resonant network 8 having adjustable contacts 25 is selected. The current of unknown frequency is supplied to the resonant device and its variable condenser is adjusted to shift the resonant point of the device until the rate of change of deflection appears to be a maximum and the contacts 25 are then adjusted until the impedance of the network 8 matches the impedance of the resonant device at this setting. The condenser 7 and contacts 25 are thereafter adjusted until the exact point at which the maximum rate of change occurs is indicated. This will be identified by the indicator recording a deflection which does not change when the network 8 is substituted for the resonant device 3. The frequency of the current may then be determined from the characteristic curve corresponding to the resonance setting of device 3 which is finally used. This is true for the reason that each characteristic curve of the resonant device 3 has a point $a$ and a point $A'$ such that the determination of one at once determines the other. Consequently having determined point $a$ we know the abscissa of point $A'$ which is the required unknown frequency. The adjustment of the non-resonant circuit 8 therefore serves as a check, in that the known attenuation for which the network 8 is set should correspond to that of the point $a$ or $a^2$ on the characteristic curve A.

This arrangement may be applied to a circuit adapted to transmit a plurality of waves of different frequencies as, for instance, in a carrier wave system, whether transmission is effected by means of physical circuits to guide the waves or by free waves, as in radio transmission.

Fig. 3 illustrates a carrier current line 9 provided with three frequency channels having band filters 10, 11 and 12 designed to freely pass currents of different frequency bands, for transmission over the separate channels. These filters are connected to the line 9 at the terminals 13, 14 and 15, and to the channel circuits $10^a$, $11^a$ and $12^a$ through the pairs of terminals $13^a$—$13^b$, $14^a$—$14^b$ and $15^a$—$15^b$ respectively.

The networks 16, 17 and 18 are similar to the element 8, but are each designed to simulate the attenuation of a corresponding filter at the carrier frequency. Thus, network 16 corresponds to filter 10, network 17 to filter 11, and network 18 to filter 12. In order to adjust the carrier frequencies for the several channels, the filters are disconnected from the line 9 and channel circuits $10^a$, $11^a$ and $12^a$, and their terminals are in turn connected to the terminals 19 of the switch 20. The channel circuits in like sequence are connected to the terminals 21. In order to adjust the source associated with the filter 10 to the frequency which it is desired to transmit over the first channel, after disconnecting all the filters from the line and channel circuits as described above, the terminals 13 and $13^a$ will be connected to the switch terminals 19, the terminals 21 will be connected to the terminals $13^b$ to which the source for that particular channel is connected and the key 20 actuated to connect that source through filter 10 to the detector 6 and indicating apparatus 5. The switch 20 will then be returned to normal and the key 22, associated with the network 16, will be actuated to cause the current to flow through this network to detector 6 to actuate the indicating apparatus 5. The source is then adjusted until that frequency is reached at which the deflection is most rapid. If, upon substitution of the network 16, a different deflection is produced the operator will proceed as described with reference to Fig. 2, to adjust the local source until equal deflections are obtained in the indicator. Due to the fact that the frequency to which adjustment is to be made is located at a portion of the transmission characteristic of the filter at which the rate of change of attenuation with frequency is very great, an extremely accurate setting may be effected. By connecting the filter terminals 14 and $14^a$ to the switch terminals 19, terminals $14^b$ to the terminals 21 and operating the switch 23 associated with network 17, the frequency of the local source supplying the second channel, may be investigated and adjusted if necessary. In a similar manner the local source for the third channel may be tested and its frequency adjusted if necessary. In this case the terminals 15 and $15^a$ will be connected to 19, $15^b$ to 21, and key 24, associated with the network 18, will be operated. Any well known means, such as a jump connection, may be used to connect the pairs of terminals 13—$13^a$, 14—$14^a$, or 15—$15^a$ to the terminals 19 of the switch 20 and terminals $13^b$, $14^b$ and $15^b$ to the terminals 21. Consequently, a detailed reference to this feature is believed to be unnecessary.

The word "transmit" and its derivatives are herein used in the broad sense, i. e. to define transference of energy from one station to another, hence, so far as the wave meter herein described is concerned, energy may be outgoing from or incoming to the station in which the meter is used.

Moreover, while this apparatus has been described as applied to circuits which include resonant means having flat-topped characteristics, it is not limited to use with resonant means of this type. On the contrary, it is to be noted that the operation of the meter does not depend upon the adjustment of the resonant means to sharp selectivity for the frequency of the wave supplied to it and hence it will be equally effective whether used with resonant means having sharp-topped or flat-topped characteristics.

Obviously then, this meter is of general application and may be used with low frequency, carrier current, sometimes referred to as wired-wireless, or radio frequency systems, at the transmitting and receiving stations and irrespective of whether the selective circuits are broadly or sharply tuned.

The non-resonant network attenuates the energy supplied to it by a definite amount when it is used and adjusted in the manner set forth in this description, and hence the energy impressed upon its input terminals bears a fixed relation to that impressed upon the indicating circuit. Since the attenuation of the network is made equal to that of the resonant device for the frequency to which adjustment is to be effected, it will be apparent that the network may properly be said to compare the energy supplied to the resonant device with that available at its output terminals.

Amplifying means may be used in the local circuit between the detector and indicator 5 if found desirable.

While in the preceding description certain specific details and arrangements have been set forth for the purpose of completely and clearly disclosing the nature of the invention and its method of operation, it is to be understood that this invention is not limited to these specific features but only by the scope of the appended claims.

What is claimed is:

1. A method of measuring the frequency of an alternating current which comprises transmitting the current through a path having a predetermined frequency selection characteristic, and comparing the output energy from said path with energy having a fixed relation to the energy supplied to said path.

2. A method of measuring the frequency of an alternating current which comprises causing the alternating current to traverse a path the attenuation of which is a function of the frequency, causing said current to traverse a path the attenuation of which is independent of frequency but is definitely related to that of the first-mentioned path, and comparing the energies transmitted through said paths.

3. A method of measuring the frequency of an alternating current which comprises causing the alternating current to traverse a path the attenuation of which is a function of the frequency, causing said current to traverse a path the attenuation of which is independent of frequency but is definitely related to that of the first-mentioned path at a point of predetermined selectivity, and comparing the energy transmitted through one path with the energy transmitted through the other path.

4. A method of measuring the frequency of an alternating current which comprises causing the alternating current to traverse a path the attenuation of which is a function of the frequency, causing said current to traverse a path the attenuation of which is independent of frequency but is related to that of the first-mentioned path at the point at which the rate of change of attenuation is a maximum, and causing the energy transmitted through the respective paths to produce equal indications.

5. A method of measuring the frequency of an alternating current which comprises causing the alternating current to traverse a path the attenuation of which is a function of the frequency, causing said current to traverse a path the attenuation of which is independent of frequency but is equal to that of the first-mentioned path at one point on its characteristic curve, and comparing the energy transmitted through the said paths.

6. A wave meter comprising a wave filter having a plurality of sections.

7. A wave meter comprising a resonant transmission circuit and means for comparing the output energy from said filter with energy bearing a fixed relation to the energy supplied to said path.

8. A wave meter comprising a wave filter and means for comparing the output energy from said filter with energy bearing a fixed relation to the energy input to said filter.

9. A wave meter comprising a resonant circuit and a non-resonant circuit and means for interchangeably connecting said circuits between an alternating current source and an indicating apparatus.

10. A wave meter comprising a resonant circuit, a non-resonant circuit, means for adjusting the resonant point of said resonant circuit, means for adjusting said non-resonant circuit and means for interchangeably connecting said circuits between an alternating current source and an indicating apparatus.

11. An electric apparatus comprising a circuit the attenuation of which is the function of the frequency, a circuit the attenuation of which is independent of frequency but is definitely related to that of the first-mentioned circuit at one point on its characteristic curve and means for interchangeably connecting said circuits between an alternating current source and an indicating apparatus.

12. A wave meter comprising a circuit the attenuation of which is the function of the frequency, a circuit the attenuation of which is independent of frequency but is definitely related to that of the first-mentioned circuit at a point of predetermined selectivity and means for interchangeably connecting said circuits between the alternating current source and an indicating apparatus.

13. An electric apparatus comprising selective means, means for adjusting said selective means to determine a definite attenuation, means the attenuation of which is independent of frequency but related to that of said selective means and means for interchangeably connecting said selective means and said related means between a source of current supply and an indicating apparatus.

14. An electric apparatus comprising a resonant circuit, means for adjusting said circuit to predetermine a point of selected rate of change of attenuation, a non-resonant network the attenuation of which is equal to that of said circuit at said point and means for interchangeably connecting said circuit and network between a source of current supply and an indicating apparatus.

15. An electric apparatus comprising a resonant circuit having a selected rate of change of attenuation with change of frequency of the waves supplied thereto, a non-resonant network the attenuation of which is equal to that of said circuit and means for interchangeably connecting said circuit and network between a source of current supply and an indicating apparatus.

16. A wave meter comprising a circuit the attenuation of which is the function of the frequency, a circuit the attenuation of which is independent of frequency but is definitely related to the point at which the maximum rate of change of attenuation of the first-mentioned circuit occurs and means for interchangeably connecting said circuits between an alternating current source and an indicating apparatus.

17. A wave meter comprising a resonant circuit, a source supplying waves of a definite frequency thereto, an indicating apparatus, means for adjusting said circuit to predetermine a point of maximum rate of change of attenuation for the waves supplied by said source, a non-resonant network the attenuation of which is equal to that of said circuit at said predetermined point and means for interchangeably connecting said circuit and network between said source of supply and indicating apparatus.

18. An electric apparatus comprising a resonant circuit and means for indicating the adjustment of said circuit to predetermine a point of maximum rate of change of attenuation for electric waves of definite frequency comprising a non-resonant network the attenuation of which is equal to that of said circuit at said predetermined point, means for adjusting the network in accordance with the adjustment of said resonant circuit, an indicator, and means for alternately connecting the resonant circuit and the network to said indicator.

In witness whereof, I hereunto subscribe my name this 17th day of April A. D., 1922.

JOSEPH W. HORTON.